(12) United States Patent  (10) Patent No.: US 8,948,732 B1
Negahban et al.  (45) Date of Patent: Feb. 3, 2015

(54) SYSTEM AND METHOD FOR RESPONDING TO SERVICE REQUESTS AND FACILITATING COMMUNICATION BETWEEN RELEVANT PARTIES

(71) Applicants: Mehrdad Negahban, McLean, VA (US); Andreas Alexandropoulos, Athens (GR); Sahand Negahban-Hagh, Cambridge, MA (US); Allen Steven Kay, Woodcliff Lake, NJ (US)

(72) Inventors: Mehrdad Negahban, McLean, VA (US); Andreas Alexandropoulos, Athens (GR); Sahand Negahban-Hagh, Cambridge, MA (US); Allen Steven Kay, Woodcliff Lake, NJ (US)

(73) Assignee: beamSmart Inc., McLean, VA (US)

( * ) Notice: Subject to any disclaimer, the term of this patent is extended or adjusted under 35 U.S.C. 154(b) by 0 days.

(21) Appl. No.: 13/740,826

(22) Filed: Jan. 14, 2013

(51) Int. Cl.
*H04W 4/22* (2009.01)
(52) U.S. Cl.
CPC .................................... *H04W 4/22* (2013.01)
USPC ....................................................... 455/414.1
(58) Field of Classification Search
USPC ....................................................... 455/414.1
See application file for complete search history.

(56) References Cited

U.S. PATENT DOCUMENTS

| | | | |
|---|---|---|---|
| 2005/0239477 A1 | 10/2005 | Kim et al. | 455/456.1 |
| 2007/0053306 A1* | 3/2007 | Stevens | 370/252 |
| 2007/0214237 A1 | 9/2007 | Stibel et al. | 709/217 |
| 2008/0132251 A1 | 6/2008 | Altman et al. | 455/457 |
| 2009/0027499 A1* | 1/2009 | Nicholl | 348/158 |
| 2009/0187486 A1 | 7/2009 | Lefenfeld et al. | 705/14 |
| 2009/0319616 A1 | 12/2009 | Lewis, II et al. | 709/206 |
| 2013/0040600 A1 | 2/2013 | Reitnour et al. | 455/404.2 |
| 2013/0041734 A1 | 2/2013 | Dean et al. | 705/14.23 |
| 2013/0104035 A1 | 4/2013 | Wagner et al. | 715/240 |
| 2014/0155018 A1* | 6/2014 | Fan et al. | 455/404.1 |

* cited by examiner

*Primary Examiner* — Kwasi Karikari
(74) *Attorney, Agent, or Firm* — Pillsbury Winthrop Shaw Pittman LLP

(57) ABSTRACT

Various systems, methods, and computer program products for responding to service requests and facilitating communication between relevant parties are provided. The system may receive a request from a user, obtain a user location, identify a service provider such as an emergency response center based on the location, facilitate coordination of response efforts, and provide a page that is shared between various parties such as the user, contacts of the user, an operator, and a responder. The various parties may provide to the system inputs such as video to capture what is currently happening. The page may be updated with the inputs, include a status of the service request such as whether responders have been dispatched, and include a current location of the responders and other users. Using the page, various parties may obtain real-time situational awareness of an event that culminated in the service request and communicate with other users.

24 Claims, 5 Drawing Sheets

SYSTEM AND METHOD FOR RESPONDING TO SERVICE REQUESTS AND FACILITATING COMMUNICATION BETWEEN RELEVANT PARTIES

FIELD OF THE INVENTION

The invention relates to responding to service requests and facilitating communication between relevant parties that are related to the service request.

BACKGROUND OF THE INVENTION

Requesting services may be cumbersome, especially for services such as emergency or roadside service that require a location of a user making the service request. The user in many instances may be unable to personally initiate or respond to emergency operators or services. In addition, coordination between the user, emergency service providers (e.g., 911 service in North America), and/or family and friends of the user may be difficult to achieve in real time during an emergency or other event that may require service.

Furthermore, such communication may require large amounts of communication bandwidth and may be dependent on the availability of particular communication channels. For example, a good telephone connection may be required.

As such, what is needed is to be able to respond to a service request and facilitate communication among various relevant parties. What is further needed is to be able to facilitate coordination of response efforts while maintaining communication between the relevant parties. These and other problems exist.

SUMMARY OF THE INVENTION

The invention addressing these and other drawbacks relates to a system and method for responding to service requests and facilitating communication between relevant parties. In some embodiments, a user may generate a service request such as an emergency request, a roadside assistance request, and/or other type of request. A page server may receive the request and identify an appropriate service provider based on a location of the user and/or the type of request being made. In order to facilitate communication between different users, the page server may create a page that is shared among different users and entities such as the user making the request, an operator who dispatches responders, responders who service the request, and contacts such as family members who may be interested in receiving updates. Each of the users and entities may provide input to the page server, which may update the page based on the input and communicate the updated page to the various users. By providing a platform by which various users and entities may communicate with one another, the system may facilitate enhanced communication and status updates between the various parties, provide real-time situational awareness to responders, and allow the various parties to receive updates as the situation unfolds.

In some embodiments, the page server may be programmed with various computer program modules to provide the features and functions described herein. For example, the page server may be programmed with a registration module, a page creator module, a recipient selector module, a communication channel selector module, a page sharing module, a workflow module, a page update module, and a voice and text conversion module.

In some embodiments, the registration module may obtain information about the user that may be useful for first responders or other service personnel responding to the user's request. The generated page may include the obtained information so that responders and others have access to this information.

In some embodiments, the registration module may register service providers such as a 911 call center, a roadside assistance provider, and/or other providers in order to add providers to the system as appropriate. In this manner, different providers may be added to the system from which the user may select to request services.

In some embodiments, the page creator module may receive the service request from a user device and may obtain a location of the user (via, for example, the location of the user device). In some embodiments, the location may be obtained from the user device from which the request is made. In other embodiments, the location may be obtained from a locator service such as, for example, a mobile service provider, an internet service provider, and/or other service that can locate the user device.

In some embodiments, the page creator module may obtain information about the user, information related to the location of the user (such as ambient conditions and crime reports related to the location), and/or other information that may be related to the service request.

In some embodiments, the page creator module may receive media such as video, audio, pictures, text, and/or other media content. The media may be received from the user device and/or other device such as a device used by a contact, an operator, or a responder. For example, a user having an emergency situation may stream video and/or send a video file in association with an emergency request. The video, audio, pictures, etc., may capture the situation in order to document what is happening and help responders obtain real-time situational awareness of an event that led to the service request.

In some embodiments, page creator module 112 may retrieve a template that serves as a basis for creating a page. The template may be associated with the type of service being requested. For example, an emergency request may be associated with an emergency service template and a roadside assistance request may be associated with a different template. A template may be configured to suit each type of service and may be provided by a service provider.

In some embodiments, different templates may be created and used for different communication channels. For example, a page that is to be shared via a broadband communication channel may be formatted differently than a page that is to be shared via Short Message Service ("SMS") text. For example, a page shared over SMS text may include less detail and content than a page shared over a broadband connection.

In some embodiments, the page creator module may generate different versions of the page based on the communication channel over which the page is to be communicated.

In some embodiments, the page creator module may generate a page based on at least some of the obtained user information, media files/streams, templates, and/or other information known or obtained about the user, information related to the surrounding location, and/or other information from other users. In some embodiments, the page may include a map overlaid with an indicator that indicates a location of the user device and/or various other devices such as a device used by a responder. The page may display the type of service request being made, an indication of the status of the service request, information obtained about the user and/or information obtained about the location of the user.

In some embodiments, the recipient selector module may identify service providers, users such as contacts, and/or other entities that should receive the generated page. For example, the recipient selector module may determine the type of service being requested and identify an appropriate service provider based on the type of service and/or location of the user.

In some embodiments, the communication channel selector module may determine which communication channel to use in order to share the generated page. Communication channels may include various mobile telecommunications networks such as, without limitation, fourth generation telecommunication network ("4G"), third generation telecommunication network ("3G"), the Internet, Public Switched Telephone Networks, Short Message Service messaging over mobile communications networks, peer-to-peer networks, ad hoc networks, and/or other technologies that allow data or voice communication. The communication channel may be selected based on current availability and/or configurable rules that define which communication channel to use. In some embodiments, certain communication channels may be preferred over others.

In some embodiments, the page sharing module may share the page to recipients identified by the recipient selector module. In some embodiments, the page sharing module may share the page via one or more communication channels selected by the communication selector module.

In some embodiments, the page sharing module may allow the requestor using the user device (or other users using other devices) to share the page with other users not identified by recipient selector module. This allows the requestor or other user such as a police officer to dynamically share the page with additional users such as an emergency medical technician after the page is generated and shared.

In some embodiments, the workflow module may create and manage workflows by providing integrated workflow tools. The workflow module may allow users such as service provider operators, managers, responders and others to view and update the current status of a request.

In some embodiments, an operator, responder, and/or others may interface with the workflow tools to update the workflow status, manage next steps that should be performed, assign assets such as responders to the service request, review assigned tasks to be completed, and/or perform other tasks related to responding to the service request. In the emergency request example, an operator of an emergency call center may dispatch responders such as officers, fire personnel, and/or others to respond to the emergency request. The responders may use the workflow tools to input their status such as being on the way, a current location, an estimated distance from the requestor, an estimated time to the requestor, an on-scene indicator, and/or other information. The responders may use the workflow tools to request additional responders, communicate with the operator/dispatcher, and/or perform other tasks related to responding to the service request.

In some embodiments, the page update module may receive updates from various users related to the generated page. Updates may be streamed, provided periodically at predetermined intervals, and/or initiated by a user providing the update.

In some embodiments, the page update module may receive an update via the workflow module. For example, the operator of a service provider may update the page to indicate that help has been dispatched and is on the way or otherwise communicate information to other users that share the page. In another example, a responder of the service provider may update the page to indicate an estimated time of arrival.

The updated page may be propagated to users for which the page has been shared. For example, the updated page is propagated to the user making the service request, user contacts, operators, responders, and/or other users for whom the page has been shared.

In some embodiments, the page update module may update the page in various ways. For example, media may be added to, updated, or removed from the page as appropriate. Messages to and from various users who share the page may be updated. A map indicating the location of the user, responders, route responders are taking/will take, estimated time/distance of arrival of responders, hospitals, routes to hospitals from the location of the user, and/or other information relevant to the service request may be updated. In some embodiments, the page update module may tag or associated each update with a timestamp so that the service request and associated events may be tracked, retrieved, and viewed throughout the course of the service request and afterward (e.g., for training purposes, gathering statistics related to response times, etc.).

In some embodiments, the voice and text conversion module may perform voice-to-text and/or text-to-voice processing to facilitate communication between various users. For example, the voice and text conversion module may receive text from the user device and may perform text-to-speech to initiate a live call to an emergency service in addition to or instead of sending a page to the emergency service. In some embodiments, the voice and text conversion module may receive audio from the user and perform speech-to-text in order to transcribe the user's voice into text to be included in the page. Similarly, text from a user may be converted to audio or other formats to be included in the page.

Other objects and advantages of the invention will be apparent to those skilled in the art based on the following drawings and detailed description.

BRIEF DESCRIPTION OF THE DRAWINGS

FIG. 7 illustrates a workflow status monitor displayed on a page, according to an aspect of the invention.

FIG. 8 illustrates a media component displayed on a page, according to an aspect of the invention.

DETAILED DESCRIPTION OF THE INVENTION

Various systems, methods, and computer program products for responding to service requests and facilitating communication between relevant parties. In one embodiment, the system may be used to receive a request, obtain a location of a user making the request, identify an operator based on the location, facilitate coordination of response efforts, and provide a communication platform using a page that is shared between various users.

The "page" includes an integrated set of content, which may include information that describes the type or nature of the request and information that is related to the user. Information related to the user may include information about the user that is pre-stored in the system or information currently learned about the user. For example, the information related to the user may include a medical history, demographic information, a current location of the user, and/or other information related to the user that may be pre-stored in the system or learned about the user.

In some embodiments, the page may be agnostic to a communication channel that is used to communicate the page to various users. In this manner, even if one communication channel such as a data channel is unavailable, another communication channel such as a Short Message Service ("SMS") channel may be used to provide the page to a user.

Whichever communication channel is used, the system may provide the page to various users, including the user making the request and the operator, thereby facilitating communication and updates between the various users in realtime. Different users may receive the page over different communication channels.

In some embodiments, the system may identify various other users with whom the page should be shared. For example, the system may identify responders who service the request, contacts of the user, and/or others who may be interested in the request or otherwise may be involved in responding to the request. The users with whom the page is shared may update the page and the updated page may be provided to the various users. In this manner, each user with whom the page is shared may provide updates to other users.

Other implementations and uses of the system will be apparent based on the disclosure herein. Having provided a broad overview of a use of the system, various system components will now be described.

Figure 1:
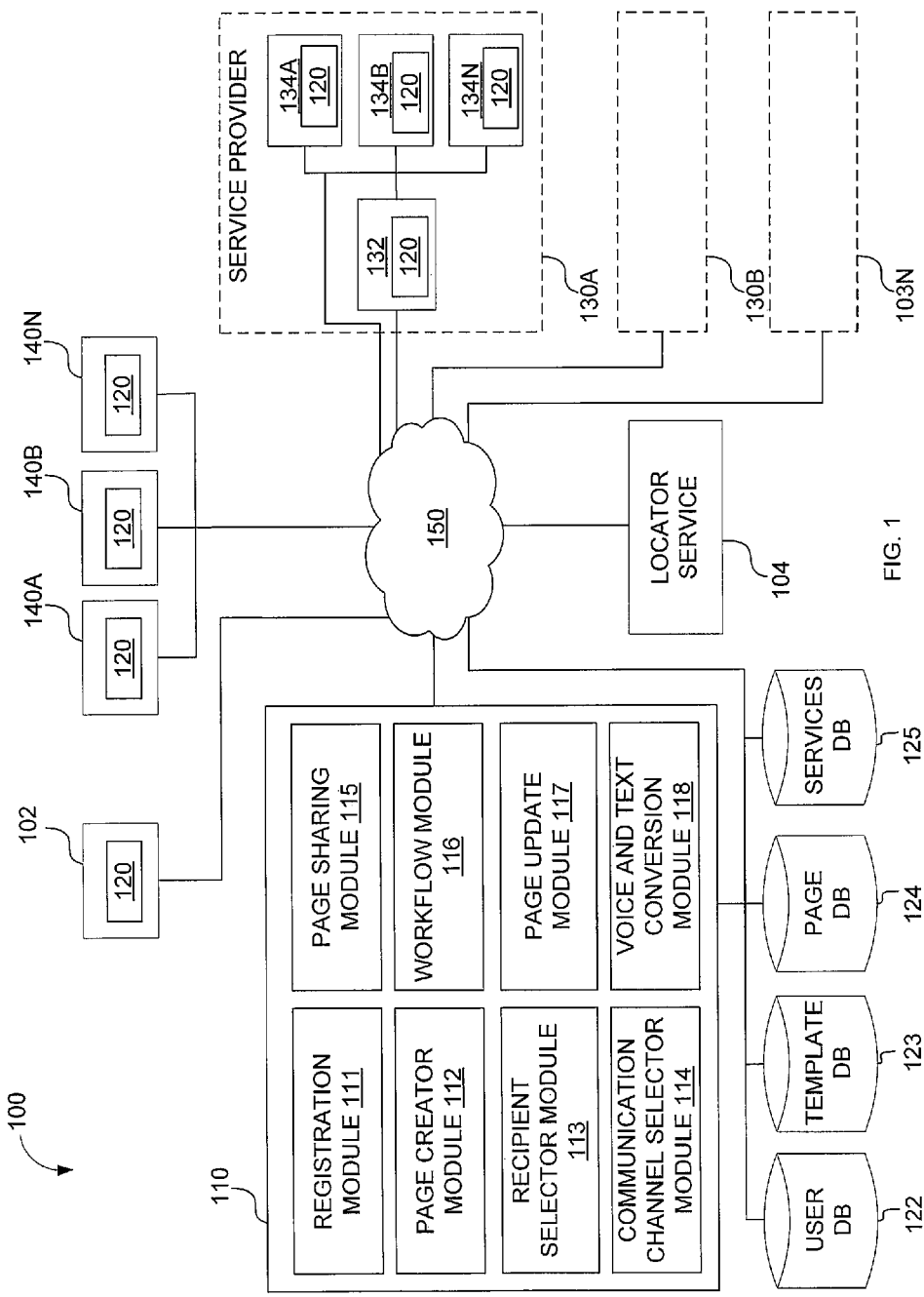
FIG. 1 illustrates a system of responding to service requests and facilitating communication between relevant parties, according to an aspect of the invention.

FIG. 1 illustrates a system 100 for responding to requests for service and alert messages based on a location, according to an aspect of the invention. In some embodiments, system 100 may include a page server 110, a user device 102, a locator service 104, a service provider 130, a contact device 140, a user database 122, a template database 123, a page database 124, a services database 125, a network 150, and/or other components.

In some embodiments, page server 110 may include one or more computers programmed to execute computer program modules. Through these program modules, page server 110 may receive and process a service request. For example, page server 110 may include a registration module 111, a page creator module 112, a service selector module 113, a communication channel selector module 114, a page forwarding module 115, a page update module 116, a workflow module 117, a voice and text conversion module 118, and/or other modules for performing the functions described herein.

In some embodiments, registration module 111 may obtain information about the user that may be useful for first responders or other service personnel responding to the user's request. In some embodiments, the user information may include personal information, medical information, emergency contact information, contact share information, authentication information, and/or other types of information known about or received from the user.

Personal information may include a name, an address, a phone number, a date of birth, and/or other personal or demographic information of the user. Medical information may include a blood type, a pre-existing medical condition, a medical history (including family medical histories), a medication being taken, an allergy, and/or other information related to the user's medical condition. Emergency contacts may include an emergency contact name (not to be confused with, for example, a 911 operator), an emergency contact phone number, a physician name, insurance name/information, and/or other information that may be useful in an emergency.

Contact share information may identify other users or entities for which a page should be shared. For example, the user may specify family members, friends, colleagues and/or users or entities for which a generated page should be communicated. In this manner, if the user requests assistance, the contacts of the user may be notified of the request via the page. In some embodiments, the contact share information may specify roles of the contacts such that different roles receive different types of pages. For example, a role may specify that pages related to all types of requests should be communicated to a user assigned with the role and another role may specify that only pages related to particular types of requests should be communicated to a user assigned with the other role.

In some embodiments, various functions of the system may require authentication such as entry of a personal identification number ("PIN") or other predefined secret from the user. As such, registration module 111 may receive and store the authentication information for later authentication.

In some embodiments, registration module 111 may register service providers such as 911 call centers, roadside assistance providers, and/or other providers in order to add providers to the system as appropriate. In this manner, different service providers may be added to the system and offered to the user. The collected service provider information may include a location or territory in which a service provider operates (e.g., jurisdictions in which emergency call centers such as 911 call centers operate or locations where roadside assistance companies operate), type of service provided, electronic addresses to which communications should be directed, and/or other information known about or received from the service provider. In some embodiments, each service provider may provide its own Application Programming Interface ("API") (not illustrated in FIG. 1) that may be used to access its data. In these embodiments, the service provider information may include information used to access the API.

In some embodiments, the registration process may include installation of one or more computer program modules 120 that configure a device of a registrant to generate an interface for exchanging communications as described herein. Such computer program modules 120 may include mobile applications operating on a mobile device, an application executing on a desktop, laptop or other device, and/or other instructions that program a device to display communications or otherwise perform functionality described herein. The registration process may include an initial registration as well as updates to the user information.

In some embodiments, page creator module 112 may receive a service request from a user device 102. The service request may be an emergency request, a request for roadside assistance, a concierge request, and/or other types of service requests for which a page may be shared among the requesting user, an operator, responders, and/or other users. In order to route the service request to an appropriate service provider 130, the service request may include the type of service request being made (such as whether the request is an emergency request).

In some embodiments, page creator module 112 may authenticate the user making the request (also referred to hereinafter as "requestor") based on previously supplied user credentials such as a PIN or other secret. For example, page creator module 112 may authenticate the user when an emergency request is made to verify that the user (e.g., instead of somebody else using the user's device) is legitimately making an emergency request.

In some embodiments, the service request may include a location of a user device (such as user device 102) from which the request is made. For example, the user device may obtain its location via GPS or other location technique and supply the location to page server 110. In other embodiments, the service request does not include the location of the user device. For example, the user device may be unable to obtain the location or may otherwise not include the location with the service request. In these embodiments, page creator module 112 may generate query locator service 104 to determine the location of the user device. Locator service 104 may include a mobile network service carrier that may locate the user device based on the base station with which the user device is connected. In some embodiments, locator service 104 may include an internet service provider that may determine a location of the user device based on an Internet protocol address or other identification that allows a location to be determined. In some embodiments, page creator module 112 may request the user to input the location via voice, text, and/or other inputs.

In some embodiments, page creator module 112 may obtain information about the user, information related to the location of the user (such as ambient conditions and crime reports related to the location), and/or other information that may be related to the service request. For example, page creator module 112 may query user database 122 to obtain all or a portion of user information that was stored during the registration process. In some instances, page creator module 112 may obtain only information that is relevant to the type of service request being made.

In some embodiments, page creator module 112 may receive media such as video, audio, pictures, text, and/or other media content from user device 102. For example, via user device 102, a user having an emergency situation may stream video and/or send a video file in association with an emergency request. The video, audio, pictures, etc., may capture the situation in order to document what is happening and help responders understand the situation.

In some embodiments, page creator module 112 may retrieve a template that serves as a basis for creating a page. The template may be associated with the type of service being requested. For example, an emergency request may be associated with an emergency service template and a roadside assistance request may be associated with a roadside assistance service template. A template may be configured to suit each type of service and may be provided by a service provider. The template may include default information to include (or exclude). In some embodiments, all templates may have at least some information or elements that are common to each template.

In some embodiments, different templates may be created and used for different communication channels. For example, a page that is to be shared via a broadband communication channel may be formatted differently than a page that is to be shared via Short Message Service ("SMS") text. For example, a page shared over SMS text may include less detail and content than a page shared over a broadband connection. In some of these embodiments, page creator module 112 may generate different versions of the page based on the communication channel over which the page is to be communicated.

Figure 6:
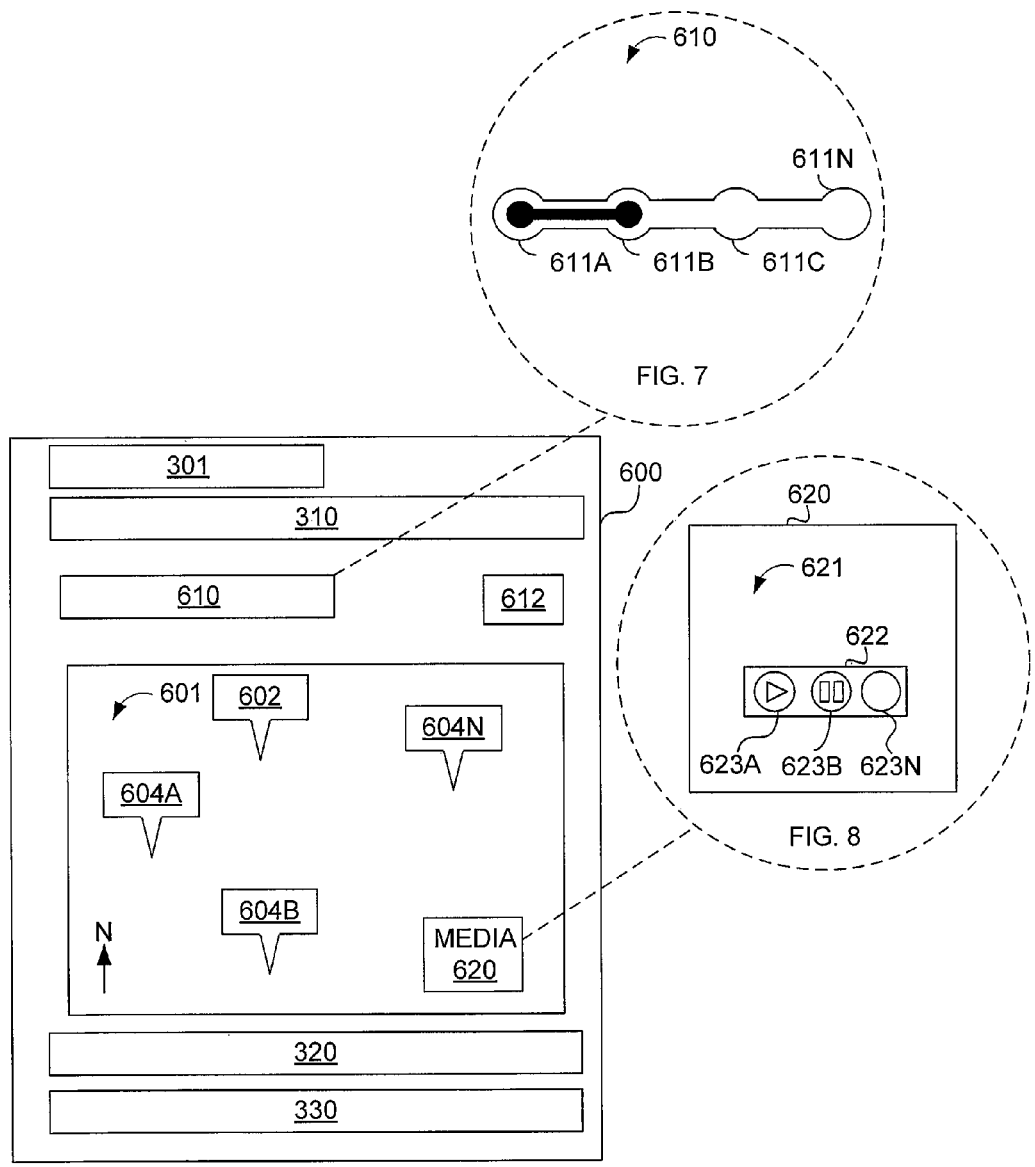
FIG. 6 illustrates a page interface 600 that illustrates a page that is viewable by various users and devices, according to an aspect of the invention.

In some embodiments, page creator module 112 may generate a page based on at least some of the obtained user information, media files/streams, templates, and/or other information known or obtained about the user, information related to the surrounding location, and/or information from other users. In some embodiments, the page may include a map overlaid with an indicator that indicates a location of user device 102. The page may display the type of service request being made, an indication of the status of the service request, information obtained about the user and/or information obtained about the location of the user. A non-limiting example of a page generated by page creator module 112 is illustrated in FIG. 6. The created page may be updated when service providers, user contacts, and/or the user provide updates to the page, as set forth in more detail below.

In some embodiments, page creator module 112 may generate the page in a format such as extensible markup language. In these embodiments, the communicated page may include content of the page that can be parsed by recipient devices (such as device 102, device 140, operator device 132, and responder device 134) to generate the page according to local device capabilities. For example, a particular recipient device may be unable to display video and may ignore any video feed and/or may request that page server 110 transmit audio or text versions of the video feed if possible.

In some embodiments, recipient selector module 113 may identify service providers, users, and/or other entities that should receive the generated page. For example, recipient selector module 113 may determine the type of service being requested and identify an appropriate service provider 130 based on the type of service and/or location of the user. In a particular example, for a user making an emergency request, recipient selector module 113 may determine the location of the user and identify an appropriate 911 call center (e.g., a call center that is responsible for 911 calls originating from the location of the user) based on the determined location. The 911 call center may be registered with the system such that an operator device 132 may be configured with computer program modules 120 to access and update the generated page. In another example, recipient selector module 113 may identify various tow services that may provide service to the user's location. In another example, recipient selector module 113 may not use the user's location to identify the service provider. For example, when the requested service is to a particular service provider such as a nationwide concierge provider, recipient selector module 113 may not use the user's location to identify the service provider.

In some embodiments, recipient selector module 113 may identify contacts 140 such as emergency contacts, user-specified contacts, and/or other users who should receive the generated page. In some embodiments, contacts may be identified based on context. For example, the generated page may not be shared with an emergency contact such as a physician or a contact such as a parent for a roadside assistance request. On the other hand, the generated page may be shared with a contact such as a friend for the roadside assistance request. Thus, using various logic or rules, which may include specifications by the user during registration, recipient selector module 113 may identify various contacts 140 with whom a page should be shared.

In some embodiments, communication channel selector module 114 may determine which communication channel to use in order to share the generated page. Communication channels may include various mobile telecommunications networks such as, without limitation, fourth generation telecommunication network ("4G"), third generation telecommunication network ("3G"), the Internet, Public Switched Telephone Networks, Short Message Service messaging over mobile communications networks, peer-to-peer networks, ad hoc networks, and/or other technologies that allow data or voice communication.

In some embodiments, the communication channel may be selected based on current availability and/or configurable rules that define which communication channel to use. In some embodiments, certain communication channels may be preferred over others. For example, communication channel selector module 114 may preferentially use a broadband communication channel such as fourth generation telecommunication network ("4G") if available. If 4G is unavailable, communication channel selector module 114 may use a third generation telecommunication network ("3G"). If neither is available, communication channel selector module 114 may share the generated page using Short Message Service ("SMS") text format, PIN-to-PIN messaging, and/or other communication channel that may be available to share pages to intended recipients.

In some embodiments, communication channel selector module 114 may determine whether a communication channel is available by sending a communication over the channel and waiting for a response. If a send failure message is received or if no response is received within a timeout period, communication channel selector module 114 may determine that the communication channel is unavailable. In this manner, even when certain communication channels are down due to congestion or other reason, pages may be shared among intended recipients (including the original requestor) so long as a viable communication channel is available. Communication channel selector module 114 may share the page over the communication channel(s) that are available and use the appropriate version created by page creator module 112 for the communication channel. In some embodiments, a particular service provider 130 may provide services to remote locations that may not have available traditional communication services. In these embodiments, a rule for the service provider may specify that satellite communications or other communication channel that does not require traditional terrestrial-based communication infrastructure should be used.

In some embodiments, if the service request is an emergency request and a required PIN input is incorrect after a predetermined number of times (including one), then communication channel selector module 114 may connect the user device 102 with an emergency service operator via voice line instead of sending a page. In this manner, if the user of user device 102 is experiencing an emergency but could not enter the correct PIN (due to duress, for example), the system may still connect the user with an emergency service operator without generating and/or sharing a page with the emergency service operator.

In some embodiments, page sharing module 115 may share the page to recipients identified by recipient selector module 113. In some embodiments, page sharing module 115 may share the page via one or more communication channels selected by communication selector module 114.

In some embodiments, page sharing module 115 may allow the requestor using user device 102 to share the page with other users not identified by recipient selector module 113. This allows the requestor to dynamically share the page with additional users after the page is generated and shared.

In some embodiments, page sharing module 115 may allow a user other than the requestor to share the page with another user not identified by recipient selector module 113. This may allow users with whom the page has been shared to share the page with another user. For example, an operator using operator device 132 of service provider 130 may share the page with a responder using responder device 134. In a particular example, an emergency service operator may share the page with an emergency responder such as police, fire, rescue, etc. In this manner, the responder may be given background and real-time situational awareness related to the emergency request, which may include the location of the user making the emergency request, media from the user making the request, and/or other content of the page.

In another particular example, one responder may share the page with another responder. For example, police responding on-scene may request an ambulance and share the page with a nearby ambulance. A responding ambulance may share the page with a local emergency room, and so forth. In this manner, entities who may be involved in or related to the service request (whether an emergency request, a roadside assistance request, a concierge request, etc.) may share the page with one another. The user or entity receiving the shared page may be apprised of the current situation as well as previous and future updates to the page.

In some embodiments, page sharing module 115 may use configurable roles to implement who may share the page with other users. In some embodiments, all or only a portion of users may be associated with a role that allows them to share a page. For example, only registered users who are responders or operators may be associated with a role that authorizes them to share the page with other users. In some embodiments, a user may specify who may share pages created for the user during the registration process.

In some embodiments, the recipients with whom the page has been shared may be registered users themselves operating a device 140 that is configured with computer program modules 120. In other embodiments, a recipient may not be registered with the system but may still receive the page via, for example, a webpage secured by a secret such as a password, a uniform resource locator that is not publicly known, and/or other technique in which to share a secure webpage or other interface.

In some embodiments, workflow module 116 may create and manage workflows by providing integrated workflow tools. Workflow module 116 may allow users such as service provider operators, managers, responders and others to view and update the current status of a request. For example and without limitation, a workflow status may include "case open," "dispatched," "on scene," and "closed" to indicate the general status of a service request.

In some embodiments, workflow module 116 may provide various workflow tools. An operator, responder, and/or others may interface with the workflow tools to update the workflow status, manage next steps that should be performed, assign assets such as responders to the service request, review assigned tasks to be completed, and/or perform other tasks related to responding to the service request. In the emergency request example, an operator of an emergency call center may dispatch responders such as officers, fire personnel, and/or others to respond to the emergency request. The responders may use the workflow tools to input their status such as being on the way, a current location, an estimated distance from the requestor, an estimated time to the requestor, an on-scene indicator, and/or other information. The responders may use the workflow tools to request additional responders, communicate with the operator/dispatcher, and/or perform other tasks related to responding to the service request.

In some embodiments, workflow module 116 may create educated scenario predictions to help minimize or prevent disasters. An educated scenario prediction may employ machine learning instructions based on analyzing previous request data related to previous requests with incoming request data related to a current request in order to predict an appropriate response to the current request. The request data may include information that describes the situation related to the request. For example, the request data may include sensor data such as sensor information indicating that an automobile airbag has deployed, audio data such as a recording of an emergency call, image data such as an image of an accident, location data such as a location of an accident, and/or other information that describes a situation that culminated in service request.

For example, the machine learning instructions may correlate sensor information indicating that an airbag has deployed at a particular location with severe accidents that require deployment of police and emergency medical assets. In this manner, when incoming sensor information related to a current request indicates that an airbag has deployed and incoming location information indicates that the airbag was deployed at the particular location, the educated scenario prediction may include a prediction that police and emergency medical assets should be deployed. Based on the prediction, the police and emergency medical assets may be deployed. In some embodiments, such deployments may be made automatically based on the educated scenario prediction without intervention by a user such as an operator or the user making the request. In some embodiments, such deployments may be recommended to an operator, who orders the deployments.

In another example, the machine learning instructions may correlate an automobile description (e.g., year, make, model, etc.) with a particular towing requirement such that appropriate tow trucks are deployed for the particular automobile in the context of towing service requests. Automatically ordering and/or recommending outcomes based on educated scenario predictions may be used in other contexts and examples as well.

In some embodiments, page update module 117 may receive updates related to the generated page. Updates may be streamed, provided periodically at predetermined intervals, and/or initiated by a user providing the update.

In some embodiments, page update module 117 may receive an update from the requestor. The update from the requestor may include a location update (e.g., whether the requestor has moved or remains stationary), media updates (e.g., new video, audio, image, text, etc.), information updates (e.g., "I'm OK now"), and/or other information that is related to the page.

In some embodiments, page update module 117 may receive an update via workflow module 116. For example, the operator of service provider 130 may update the page to indicate that help has been dispatched and is on the way or otherwise communicate information to other users that share the page. In another example, a responder of service provider 130 may update the page to indicate an estimated time of arrival.

The updated page may be propagated to users for which the page has been shared. For example, the updated page is propagated to the user making the service request, user contacts, operators, responders, and/or other users for whom the page has been shared. In some embodiments, the updates to the page may be made as they are received. In this manner, page update module 117 may facilitate communication between users with whom the page has been shared. In some embodiments, page update module 117 may send out a communication independent from the page (e.g., via an email to a contact's email address) indicating the updates.

In some embodiments, page update module 117 may update the page in various ways. For example, media may be added to, updated, or removed from the page as appropriate. Messages to and from various users who share the page may be updated. A map indicating the location of the user, responders, route responders are taking/will take, estimated time/distance of arrival of responders, hospitals, routes to hospitals from the location of the user, and/or other information relevant to the service request may be updated. In some embodiments, page update module 117 may tag or associate each update with a timestamp so that the service request and associated events may be tracked, retrieved, and viewed throughout the course of the service request and afterward (e.g., for training purposes, gathering statistics related to response times, etc.).

In some embodiments, voice and text conversion module 118 may perform voice-to-text and/or text-to-voice processing to facilitate communication between various users. For example, voice and text conversion module 118 may receive text from user device 102 and may perform text-to-speech to initiate a live call to an emergency service in addition to or instead of sending a page to the emergency service. In some embodiments, voice and text conversion module 118 may receive audio from the user and perform speech-to-text in order to transcribe the audio (e.g., user's voice) into text to be included in the page. Similarly, text from a user may be converted to audio or other formats to be included in the page.

Although particular examples such as an emergency request or roadside assistance request have been described with respect to the use of page server 110, the examples should not be viewed as limiting and were merely for convenience and understanding. Various other implementations and uses of system 100 are contemplated.

For example, in some embodiments, page server 110 may be used for crisis management. In these embodiments, a field agent on-scene at a crisis situation may generate a request via user device 102. Operator 132 in this example may include a command center set up by a crisis or relief management organization and responder device 132 may include other responders or assets for that may be responsible for responding to the crisis.

In some embodiments, page server 110 may be used for company management and planning. In these embodiments, an employee of the company may generate a request via user device 102. Operator device 132 in this example may be used by a group manager and responder devices 134 may be used by other employees to complete a task.

Other uses and implementations of page server 110 will be apparent to those having skill in the art based on the disclosure herein. Having provided an overview of implementations and components of page server 110, various other components of system 100 will now be described.

In some embodiments, page server 110 may include or otherwise access various databases to store and/or retrieve information. The various databases may include, for example, a user database 122, a template database 123, a page database 124, a services database 125, and/or other databases. User database 122 may store information known or obtained about a user such as user information received during the registration process. Template database 123 may store templates used to create a page. Page database 124 may store information related to a page. For example, when page creator module 112 generates a page, a page identifier that identifies the page may be generated and stored in page database 124. The page identifier may be associated in page database 124 with various content and updates to the page such as, for example, an identity of the requestor, a location of the requestor or other users, status updates, workflow updates, media content, and/or other information related to the generated page.

In some embodiments, page database 124 stores a record of users (e.g., operators, contacts, responders, etc.) with whom the page has been shared. In this manner, page database 124 allows retrieval of content related to a generated page as well as an identification of users who had access to the page. At least some records stored by page database 124 may be time stamped such that page content may be generated in real-time and/or a historical timeline of events related to the page may be generated. Services database 125 may store information about service providers. For example, emergency service providers and their respective service locations may be stored in services database 125 so that appropriate emergency service call centers or operators may be identified. In some embodiments, service database 125 may store any API interface calls that a service provider may use to access its systems.

In some embodiments, user device 102, contact device 140, operator device 132, and responder device 134 may each be or may include a mobile device, one or more computing devices (e.g., specialty computing systems, desktop computers, personal computers, mobile computing devices, tablet computing devices, smart-phones, or other computing devices) having one or more processors (e.g., microprocessors), memory devices (e.g., hard disk, RAM, EEPROM, etc.), input/output components, and/or other computing components for performing the features and functions described herein (and/or other features and functions). Each of the foregoing devices may have one or more user interfaces such as a keypad, a display, a voice recognition microphone and speaker to interact with a distressed user. In some embodiments, each of the foregoing devices comprises a processor coupled to a memory over a bus to carry out the features and functionalities of the embodiments described herein. In some embodiments, each of the foregoing devices comprises one or more computer program modules 120 residing in the memory thereof and generating a display that is displayed to the user via the display. Each of the foregoing devices may have an antenna to wirelessly communicate with other components of system 100 over network 150 or independent of network 150.

In some embodiments, user device 102, contact device 140, operator device 132, and responder device 134 may each include a Global Positioning System (GPS) unit to determine its location, allowing each device to transmit its location to other components in system 100. Alternatively or additionally, each of the foregoing devices may be Global System for Mobile Communications (GSM) enabled to convey its location. Other techniques for locating these devices may be used such as multilateration and input by an operator of each device.

In some embodiments, user device 102, contact device 140, operator device 132, and responder device 134 may each be programmed with one or more computer program modules 120 (used interchangeably with "application 120" or "user application 120") to display pages, update pages, communicate with page server 110 and other users, and/or perform other functions related to a page as described herein.

In some embodiments, user application 120 may provide a programmed device with general functionality that may be common to all of the programmed devices. For example, user application 120 may provide an audio and/or visual interface to communicate with other components of system 100 via one or more input components (e.g., hard or soft buttons, tabs, voice recognition inputs, etc.). The one or more input components may be responsive to touch, voice, or other forms of user inputs. In some embodiments, user application 120 may display or otherwise provide control of one or more of the generated pages. For example, in some embodiments, user application 120 may display a map with various location based identifiers and indicators that show the location of various entities and assets such as responders as discussed herein.

In some embodiments, user application 120 may provide functions that are specific to the context in which they are used. For example, a responder device 134 may include functionality that a contact device 140 may not have and vice versa. It should be noted that user application 120 may provide the same functionality to a contact device 140 and user device 102. For example, a user of contact device 140 may be registered to send out a service request and a user of user device 102 may be a contact of the user of contact device 140.

In some embodiments, user application 120 may program user device 102 to include an interface for generating a service request or alert message. User device 102 may display a user interface that includes a plurality of input components such as icons or buttons that may be selected by the user to initiate a service request (or alert message) corresponding to the input component. For example, an input component may correspond to a type of service request. In some embodiments, a user may configure (e.g., during registration) which services the user wishes to display on the interface. For instance, a user may be subscribed to some services but not others. In some embodiments, an emergency service is included in each user application 120 operating on user device 102 irrespective of user configurations.

In some embodiments, one or more input components may be color-coded or otherwise displayed differently from other input components to indicate various levels of urgency or various types of situations.

In some embodiments, upon receiving a service request or other alert message, user device 102 may be programmed by user application 120 to obtain a location of user device 102 via GPS, multilateration, prompting the user to input a location such as an address, and/or other technique. In some embodiments, user device 102 may be programmed by user application 120 to preferentially use some location techniques over others such as preferring more accurate techniques over less accurate techniques.

In some embodiments, user device 102 may be programmed by user application 120 to prompt for a PIN or other secret to process the service request or alert message. For example, upon receiving a selection of an input component corresponding to an emergency service request, user device 102 may be programmed to prompt for a PIN in order to verify that the user is legitimately requesting an emergency service. PIN validation may occur at the user device 102 and/or at page server 110. If the PIN is incorrect a predefined number of times (including one), user device 102 may be programmed to directly dial 911 (or equivalent in jurisdictions outside North America). In some embodiments, service provider 130 (illustrated in FIG. 1 as service providers 130A, 130B, . . . , 130N) may include various entities such as an emergency service call center and corresponding response units, a roadside assistance provider, a crisis management center such as national or local emergency management agencies, a concierge service, a private corporation's management system, an emergency alert system such as an "AMBER" alert or security threat level alert system, and/or other entity that may manage requests or dispatch alerts via shared pages described herein.

In some embodiments, service provider 130 may include an operator device 132 and responder devices 134. Component details of service providers 130B and 130N are omitted in FIG. 1 for convenience but each may be configured in a manner similar to service provider 130A.

In some implementations, operator device 132 may be operated by a live operator to assist the user of user device 102. In some embodiments, operator device 132 may be provided with one or more pages generated by page server 110. Accordingly, operator device 132 may include a version of user application 120 that enables display of and/or other instructions with one or more of the generated pages. In some embodiments, operator device 132 may be located at a geographical location that is closest to user device 102 as compared to other operator devices. Operator device 132 may comprise a computer terminal used by a live operator that can connect to user device 102 via network 150 or independently. Operator device 132 may include audio, video, or audio and video based communication interfaces (e.g., microphone, camera, etc.) to communicate with a user associated with user device 102, and/or other devices.

In some embodiments, operator device 132 may be programmed by user application 120 to generate a workflow interface that provides an interface to functions provided by workflow module 116. For example, an operator may receive a service request and view the generated page associated with the service request. The operator may assign the service request to one or more responders who may be able to assist the user making the request. The one or more responders may access the page associated with the request via responder device 134. A responder may include, for example, a police officer, fire personnel, a hospital, a tow truck, a hospital, and/or other user or entity that may respond to the service request.

In some embodiments, responder device 134 may be programmed by user application 120 to accept assignments that are given to a corresponding responder, view pages associated with the service request, view service requests in the queue for which a responder may provide services, volunteer to accept service requests, and/or otherwise interact with a page generated in association with a service request. Responder device 132 may further be programmed to facilitate communication with the requestor, the operator, and/or other users via the generated page and/or via communication links unrelated to the generated page. In some embodiments, responder device 132 may be programmed to request backup or different types of responders. In these embodiments, responder device 132 may cause the page to be shared with other responders and/or other service providers 130.

In some embodiments, contact devices 140 may be or include the devices used by contacts of the user of user device 102 (e.g., friends, family, co-workers, strangers, etc.). In some embodiments, contact device 140 may be programmed by user application 120 to allow users to provide updates in a manner that is similar to user device 102 and/or responder device 134. For example, a user of contact device 140 may supplement any known information about the requestor with additional information such as a newly acquired medical condition or other information that may not otherwise be known to the system. In some embodiments, contact device 140 may indicate that it too is on the scene or nearby user device 102. For example, a user of contact device 140 may take videos, pictures, descriptions, etc., while on scene to supplement content provided by, or add content on behalf of, user device 102. A user of contact device 140 may also communicate with the requestor via the generated page, provide a location of contact device 140 (which may be indicated on a map displayed by the page, indicated by text displayed by the page, etc.), and/or update the page.

In some embodiments, network 150 may be or include a communications network capable of supporting one or more modes of communications, including but not limited to, wireless, wired, and optical communications. For example, network 150 may comprise cell phone towers or other wireless communication infrastructure, public switched telephone networks (PSTN), active and passive optical networks, and combinations thereof. Examples of such networks may include computer implemented networks such as the Internet, a local area network (LAN), a wide area network (WAN), etc.

Those having skill in the art will recognize that user device 102, contact device 140, operator device 132, and responder device 134 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

The databases 122-125 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The foregoing description of the various components comprising system 100 is exemplary only, and should not be viewed as limiting. The invention described herein may work with various system configurations. Accordingly, more or less of the aforementioned system components may be used and/or combined in various implementations.

Figure 2:
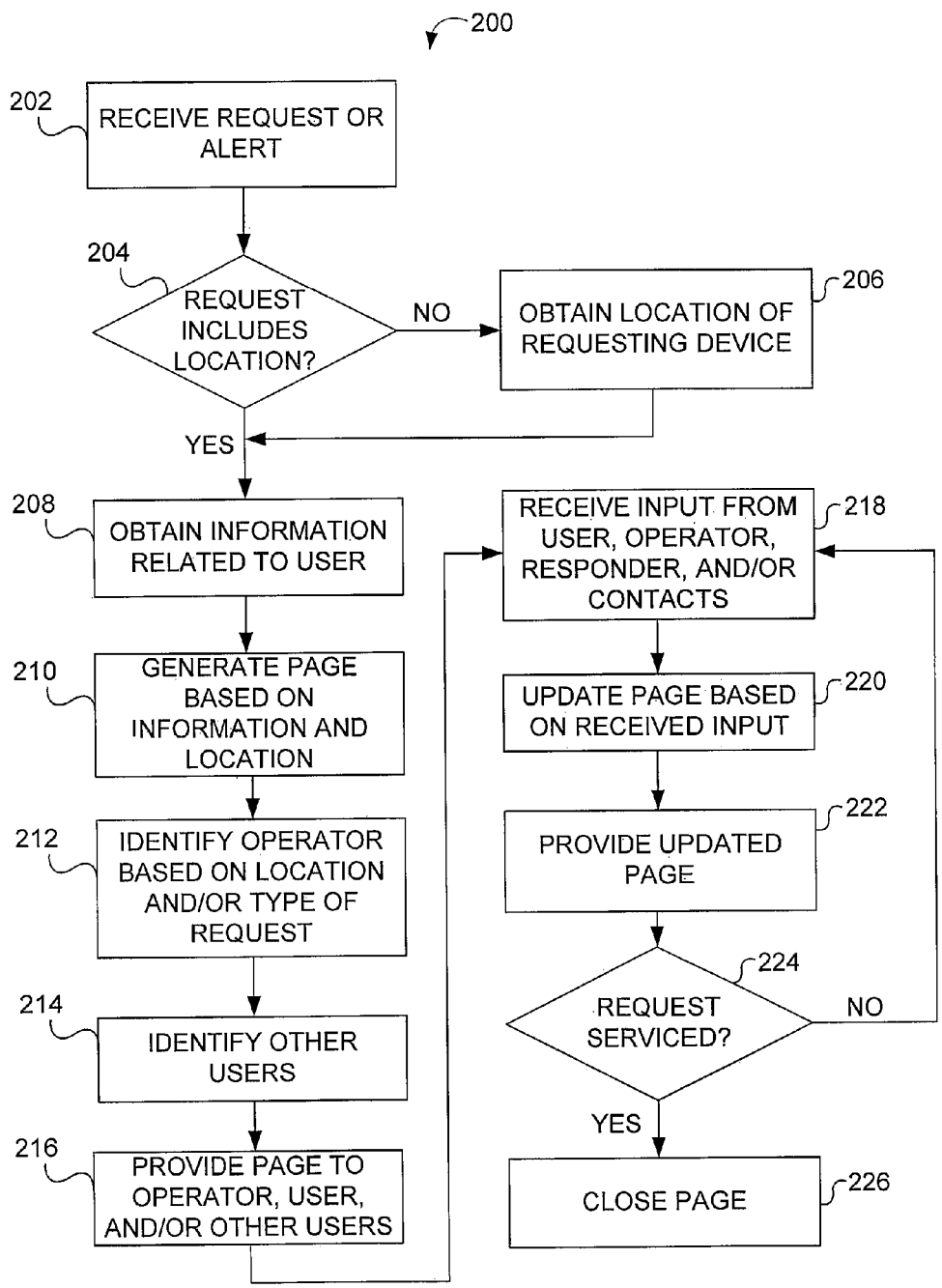
FIG. 2 illustrates a process for responding to service requests and facilitating communication between relevant parties, according to an aspect of the invention.

FIG. 2 illustrates a process 200 for responding to service requests and facilitating communication between relevant parties, according to an aspect of the invention. The various processing operations and/or data flows depicted in FIG. 2 (and in the other drawing Figures) are described in greater detail herein. The described operations may be accomplished using some or all of the system components described in detail above and, in some embodiments, various operations may be performed in different sequences. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, process 200 may include receiving a request for service. In an operation 204, process 200 may include determining whether the request includes a location of the user. If the request does not include a location of the user, process 200 may include obtaining the location of the user in an operation 206. For example, the request may include an identifier such as a mobile phone number associated with a mobile device from which the user made the request. Process 200 may request from a location database (which may be maintained by one or more mobile communication service providers) a current location of the mobile device. The location database may determine an estimated location based on cell towers in communication with the mobile device. Processing may proceed to an operation 208 when the location has been obtained.

In some embodiments, the request may include the location. For example, the mobile device may obtain the location via GPS or other location-determining technique and include the location along with the request. Returning to operation 204, if the request includes the location of the user, processing may proceed to operation 208.

In operation 208, process 200 may include obtaining information related to the user. The information may include, for example, a medical history, demographic information, and/or other information related to the user. The information may be pre-stored and/or may be learned from the user via the request (e.g., the user may enter relevant information as part of the request).

In an operation 210, process 200 may include generating a page based on the location and information related to the user. In an operation 212, process 200 may include identifying an operator that can handle the request based on the location and/or the type of request. For example, the operator may be identified based on whether the request is a 911 emergency request or a roadside assistance request. The operator may be further identified based on the current location of the user. For example, the appropriate 911 operator or an appropriate towing service provider may be identified based on the user's current location.

In an operation 214, process 200 may include identifying additional users who should receive the page. For example, a user may have previously or currently specified that a family member or friend should have access to and be provided with the page. In another example, an operator or responder may share the page with another responder.

In an operation 216, process 200 may include providing the page to the various users. In an operation 218, process 200 may include receiving input from the user making the request, the operator, the responder, the contact, and/or other user. The input may include audio, video, pictures, text, and/or other types of input. In an operation 220, process 200 may include updating the page based on the received input. In an operation 222, process 200 may include providing the updated page to the various users.

In an operation 224, process 200 may include determining whether the request has been serviced. For example, process 200 may receive an indication that a 911 requestor is safely delivered to a hospital, the user's car has been towed, and/or other event that otherwise indicates that the request has been serviced.

If the request has been serviced, process 200 may include closing the page or otherwise providing an indication on the page that the request has been serviced in an operation 226. Returning to operation 224, if the request has not been serviced, process 200 may include returning to operation 218, where further input from the various users may be received.

FIGS. 3-8 illustrate examples of graphical user interfaces and elements thereof, according to various aspects of the invention. The interfaces and elements illustrated in the drawing figures are for illustrative purposes only. Various components may be added, deleted, moved, or otherwise changed so that the configuration, appearance, and/or content of the interfaces and elements may be different than as illustrated in the Figures. Accordingly, the graphical user interface objects as illustrated (and described in greater detail below) are exemplary by nature and, as such, should not be viewed as limiting.

In some embodiments, the interfaces and/or various components thereof illustrated in FIGS. 3-8 may be communicated from page server 110 to various executing devices that display the interfaces. The various executing devices may include, for example, user device 102, contact device 140, operator device 132, responder device 134, and/or other device that is communicably coupled to page server 110 and able to display the interfaces and/or components. The interfaces and/or components may be communicated via a webpage executed by a browser, interfaces/instructions executed by a mobile application, and/or other program such as user application 120 that can read and execute instructions for generating the interfaces/components.

In some embodiments, the various interface components illustrated in the Figures may cause the executing device to perform corresponding functions described herein and/or may cause the executing device to request from page server 110 and/or other computing device remote from the executing device to perform the corresponding functions described herein.

Figure 3:
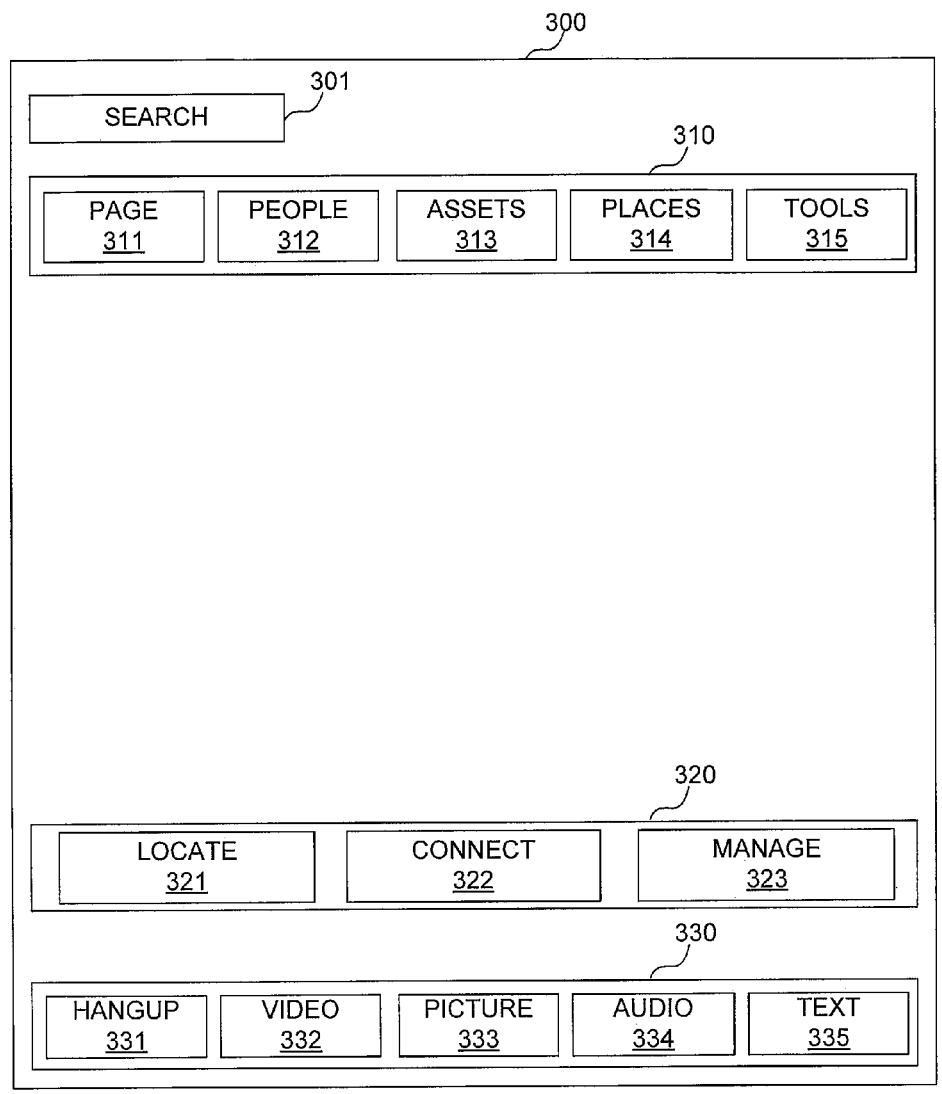
FIG. 3 illustrates examples of interface components that may be common to other interfaces illustrated in FIGS. 4-8, according to an aspect of the invention

FIG. 3 illustrates examples of interface components that may be common to other interfaces illustrated in FIGS. 4-8, according to an aspect of the invention. In other words, at least some of the interface objects illustrated in FIG. 3 may be included with other interfaces illustrated in FIGS. 4-8.

In some embodiments, the various interface components illustrated in the Figures may be context-specific. For example, different functions may be imparted to a component based on whether the component is displayed by a device that is a user device, a contact device, an operator device, a responder device, or other type of device. For example, the "asset" 313 component may reveal all assets at the disposal of an operator when selected via an operator device while the same component may display only assets assigned to a request when selected at a user device, as will be described in more detail below.

Referring to FIG. 3, in some embodiments, search component 301 may be configured to receive one or more search terms. Upon input of the search terms, search component 301 may cause the executing device to execute a search query using a search engine and/or using page server 110. For example, search component 301 may be configured to receive a search term "hospital" and a resulting list of hospitals nearby the requestor or other location may be displayed.

In some embodiments, a toolbar 310 may include various tools to view various aspects of a request. For example, toolbar 310 may include a page component 311, a people component 312, an assets component 313, a places component 314, a tools component 315, and/or other components.

In some embodiments, page component 311 when selected may cause the executing device to display one or more pages to which the user operating the executing device has access. A user making the request, for example, may view a listing of current or past requests made by the user. An operator may view pages for which the operator is assigned requests. A responder may view pages for which the responder is tasked to respond to the request or event. A user contact may view pages for that a requesting user has shared with the user contact. If only one page has been shared with the user, selection of the page component 311 may cause the executing device to display the page (instead of a listing).

In some embodiments, people component 312 when selected may cause the executing device to display people associated with a page. For example, when selected while a page is being viewed, people component 312 may cause the executing device to display a listing of the requesting user, an operator, a responder, a user contact, and/or other people related to the page. Upon selection of a particular person, additional details about that person may be made available. For example, upon selection of the user making the request, the medical history and/or other information known or obtained about the user may be displayed.

In some embodiments, assets component 313 when selected may cause the executing device to display assets related to a page. For example, assets may include various responders such as an ambulance, a police car, a tow truck, a food/emergency supply vehicle, and/or other responders who are tasked with servicing the request. In some embodiments, the assets component 313 may be context-specific. For example, an operator device listing assets based on selection of the assets component 313 may include all assets at the operator's disposal while a user device may have access to only assets related to the page that was created to service the requesting user's request.

In some embodiments, places component 314 when selected may cause the executing device to display places related to a page. For example, when selected, places may cause a hospital, emergency shelter, and/or other places relevant to a page to be displayed.

In some embodiments, tools component 315 when selected may cause the executing device to display various tools such as a user information manager to be displayed. For example, using tools component 315, a user may set or update various user information such as display preferences, user authentication information, medical history information, and/or other information that is specific to a user.

In some embodiments, a page management component 320 may include various components for managing a page. For example, page management component 320 may include a locate component 321, a connect component 322, a manage component 323, and/or other components.

In some embodiments, locate component 321 when selected may cause the executing device to initiate a locate function. The locate function may request a location of various people, assets, places, and/or other items that may be located. For example, an operator may request to locate a particular responder. The request may be made to page server 110 and/or directly to the responder. In some embodiments, locate component 321 may be used by the operator to request a location of a user making the request. For example, if the request does not include a location, locate component 321 may be used to make a request to locator service 104 to locate the user (e.g., locate user device 102) making the request and/or other user or asset. Other users may similarly request a location of various users/assets as well.

In some embodiments, connect component 322 when selected may cause the executing device to initiate a connection with various users or assets. For example, a user making the request may wish to connect with a responder. Selection of connect component 322 may cause a direct connection to be established between the user and the responder. Other users may similarly request a communication with various users/assets as well.

In some embodiments, manage component 323 when executed may be used to manage various people, assets, places, etc. For example, when selected on an operator device, manage component 323 may cause the executing device to display requests from requesting users in order to dispatch responders. When selected on a responder device, manage component 323 may cause the executing device to display requests that have been assigned to the responder or otherwise display requests for which the responder may volunteer to service. When selected on a user device, manage component 323 may cause the executing device to display users with whom the page should be shared. Other users may similarly manage their respective aspects of a page using manage component 323.

In some embodiments, communication management component 330 may include various components for managing communications related to a page. For example, communication management component 330 may include a hangup component 331, a video component 332, a picture component 333, an audio component 334, a text component 335, and/or other components.

In some embodiments, hangup component 332 when selected may discontinue a communication between the executing device and a device remote from the executing device. For example, if a requesting user established a communication with a contact using connect component 322, the requesting user (or the contact) may terminate the established communication via the hangup component. In some embodiments, hangup component 332 may terminate the page. For example, the user making the request may terminate the page, thereby indicating that the service requested is no longer needed, was in error, or otherwise should be closed.

In some embodiments, video component 332 when selected may cause the executing device to initiate a video capture device to begin recording and/or streaming video. For example, the user making the request may begin to stream and/or record and send video that will be included on the page. In this manner, the user making the request and/or other user may update the page with video captured via the executing device.

In some embodiments, picture component 333 when selected may cause the executing device to initiate a photo capture device (which may include the same or different device than the video capture device) to take a picture. The executing device may communicate the picture to be included in the page.

In some embodiments, audio component 334 when selected may cause the executing device to initiate a microphone or other audio recording device to record or stream audio. The executing device may communicate the picture to be included in the page.

In some embodiments, text component 335 when selected may cause the executing device to display a keypad or keyboard for inputting alphanumeric or other characters to be included in the page.

Thus, using various input components, communications management component 330 may allow a user to record, stream, or otherwise communicate various forms of media to page server 110 or other remote device for updating the page. The communicated media may be included as part of the page so that other users are able to access the media in an integrated display with other content related to the page.

Various users may each use the search component 301, toolbar 310, page management component 320, and communication management 330 in order to view, update, and/or otherwise interface with the page in order to communicate with other users and obtain information related to the user making the request.

Figure 4:
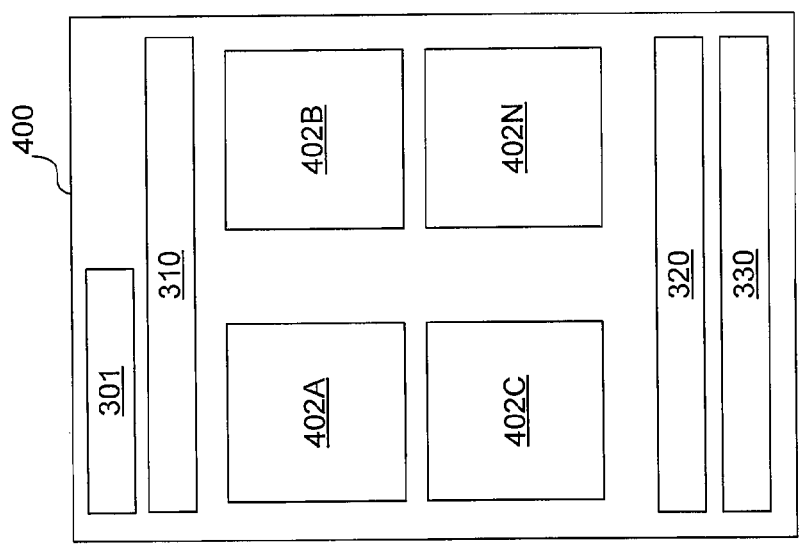
FIG. 4 illustrates a request selection screen 400 used to make a request, according to an aspect of the invention.

FIG. 4 illustrates a request selection screen 400 used to make a request, according to an aspect of the invention. In some embodiments, request selection screen 400 may be displayed by user device 102 to receive an input request or alert message. For example, request selection screen 400 may include various request components 402 (illustrated in FIG. 4 as request component 402A, 402B, 402C, . . . , 402N). Each request component 402 may be associated with a corresponding type of service. For example, request component 402A when selected may cause a request for roadside assistance to be generated and request component 402B when selected may cause a request for emergency services to be generated. In some embodiments, a request component 402 may be colored, sized, shaped, or otherwise displayed differently from another request component. This may be to highlight certain services over others, such as highlighting an emergency request component.

In some embodiments, a request component 402C may include an "I'm OK" or other indication that communicates that the user making the request is fine and/or that an open page should be closed. Other types of request components 402 may be added as well. In some embodiments, a user of user device 102 may sign up for various different types of services administered by page server 110.

In some embodiments, upon receiving a selection of a request component 402, user device 102 may be programmed to generate a request to page server 110. The request may include the type of request being made. In some embodiments, user device 102 may be programmed to determine a location of user device 102 and include the location within the request. Upon receipt of the request by page server 110, the page server may then generate a page and route the page to an appropriate operator based on the type of request and/or the location as described herein.

Figure 5:
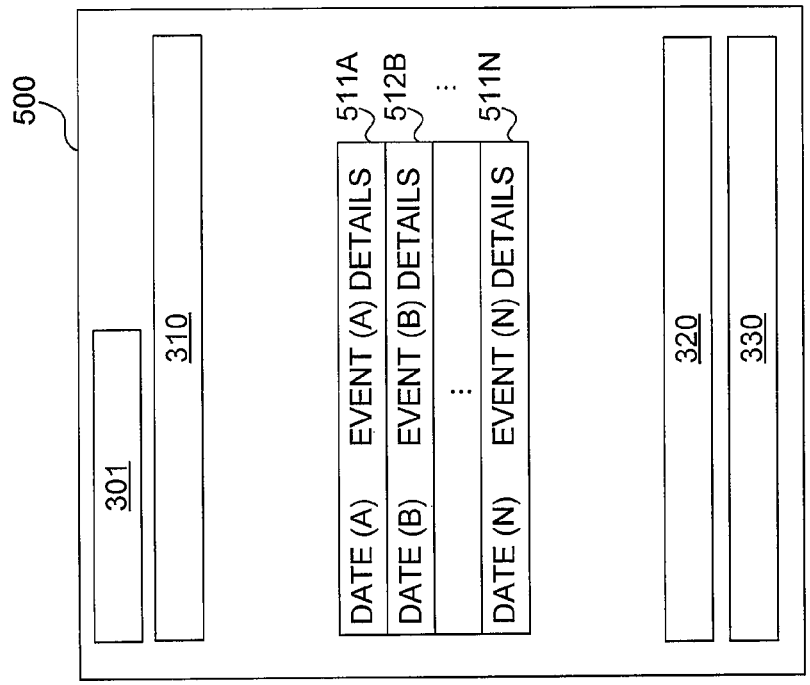
FIG. 5 illustrates a request notification screen 500 that notifies an operator of incoming requests from various user devices 102, according to an aspect of the invention.

FIG. 5 illustrates a request notification screen 500 that notifies an operator of incoming requests from various user devices 102, according to an aspect of the invention. In some embodiments, request notification screen 500 may be displayed on operator device 132 and used by an operator to view incoming requests. For example, page server 110 may generate a page in response to the user request (initiated as illustrated by, for example, FIG. 4) and then communicate a notification of the request and page via request notification screen 500.

In some embodiments, request components 511 (illustrated in FIG. 5 as request 511A, 5116, . . . , 511N) may display, for example, a date/time of receipt of a request and details concerning the request. For example, each request component 511 may display a type of request, a location of the user (e.g., location of a user device 102 used to make the request), and/or other information related to the incoming request.

In some embodiments, the request component 511 is selectable so that the operator may open a page that was generated by page server 110 based on the request. Using the page, an operator may use various tools with respect to toolbar 310 to dispatch/assign various assets to service the request.

FIG. 6 illustrates a page interface 600 that illustrates a page that is viewable by various users and devices, according to an aspect of the invention. In some embodiments, page interface 600 may include a map display 601, a user location indicator 602, people/asset location indicators 604 (illustrated in FIG. 6 as people/asset/places location indicators 604A, 604B, . . . , 604N), a workflow status monitor 610, an information component 612, a media component 620, and/or other components.

In some embodiments, map display 601 may display a map, which may be displayed coincident with graphical objects (e.g., graphical objects may be embedded, overlaid, etc., onto the map or the map may be overlaid onto the graphical objects).

In some embodiments, user location indicator 602 may indicate a location of the user making the request. In some embodiments, the user location indicator may be selected to reveal information related to the user such as a geographic coordinate or other location indication, medical information, and/or other information known or obtained about a user.

In some embodiments, people/assets/places location indicators 604 may indicate a location of various people such as user contacts, assets such as responders, and places such as hospitals. For mobile ones of the foregoing, the location indicators may be updated in real-time or based on a pre-defined interval. In this manner, each user or entity with whom the page has been shared may view a location of relevant people/assets/places. For example, the user making the request may be updated with a location of a responder or a contact who may be on the way. An operator may obtain a full understanding of the situation and location of assets.

In some embodiments, people/assets/places location indicators 604 may be selectable such that when selected, page interface 600 may display information known or obtained about the corresponding person, asset, or location. For example, selection of an asset location indicator cause to be displayed a description of the type of asset (e.g., police, fire, rescue, tow truck, etc.), an estimated time of arrival, a distance away, a name of a responder, and/or other information known or obtained about the asset.

In some embodiments, a people/assets/places location indicator 604 may display an icon, photo, or other indication that indicates whether the indicator corresponds to a person, an asset, or a place.

In some embodiments, user location indicator 602 and/or people/assets/places location indicator 604 need not be selected to reveal the information known or obtained about the user, person, asset, or place. For example, space and format permitting, user location indicator 602 and/or people/assets/places location indicator 604 may display any or all of the known or obtained information.

In some embodiments, information component 612 may be selected to obtain information related to the page. For example, information component 612 may display page details such as information known or obtained about the user, assets, places, and/or other users or entities related to the page.

Referring to FIG. 7, in some embodiments, workflow status monitor 610 may display a status of the response to a request. For example, workflow status monitor 610 may include various statuses 611 (illustrated in FIG. 7 as status 611A, 611B, 611C, . . . , 611N). Status 611A may indicate that the page has been opened. Status 611B may indicate that responders have been dispatched. Status 611C may indicate that responders are on-scene. Other statuses may indicate various states of the page such as a closed state (e.g., serviced, terminated by the requestor, etc.). As illustrated, workflow status monitor 610 indicates that status 611B is achieved. The various statuses may be pre-defined or may be dynamically added by a user such as an operator. In some embodiments, the various statuses may be configured based on the type of request (e.g., an emergency request may have different status states than a roadside assistance request).

In some embodiments, media component 620 may display various media related to the page. Although only one media component 620 is illustrated in FIG. 6, page interface 600 may include more than one media component 620, which may each display different content.

Referring to FIG. 7, media component 620 may include content 621, and content control 622. Content 621 may include video, photo, audio, text, and/or other media provided by the user making the request, a user contact, a responder, an operator, a place, and/or other user or entity with whom the page has been shared. In some embodiments, the displayed media may include news clips and/or other content related to the location or other information gathered from sources other than the users with whom the page has been shared. In this manner, disaster relief efforts, for example, may integrate news and/or other content related to an area related to the page. Content control 622 may include various controls 623 (illustrated in FIG. 7 as controls 623A, 623B, . . . , 623N).

Because each user with whom the page has been shared may view information, location of users/entities/places, media content, and other information included with a page, all parties involved in the page may be apprised of the current situation related to the request that culminated in creation of the page. The operator/responder may obtain a fuller understanding of the needs and situation of a user making the request.

The various user interface components described herein may include hard (e.g, mechanical) or soft (e.g., touch screen or touch pad) buttons, text inputs, icons, selection lists, and/or other user interface objects that may be used to receive an input and/or provide an output. As used herein, the term "selection," "select," "selected," "selecting," etc. with respect to user interface components may include, for example, pressing a hard or soft button, clicking, highlighting, hovering over, or otherwise indicating an interest in executing one or more functions related to the selected user interface component.

In the Figures, like numerals represent equivalent elements or features. Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method of responding to service requests and facilitating communication among parties related to the service request, the method being implemented in a computer that includes one or more processors programmed with one or more computer program instructions, the method comprising:
   processing, by the one or more processors, a service request from a user device;
   obtaining, by the one or more processors, a location of the user device based on one or more geographic coordinates;
   identifying, by the one or more processors, a user of the user device based on the service request;
   obtaining, by the one or more processors, pre-stored personal information of the user, wherein the pre-stored personal information: (i) is obtained from the user during a registration process that registers the user to allow the user to make the service request, (ii) is used in association with servicing the service request, and (iii) comprises demographic information that describes the user;
   identifying, by the one or more processors, a service provider based on the location of the user device and the service request, wherein the service provider is associated with an operator device used by an operator to respond to the service request;
   generating, by the one or more processors, a page comprising the pre-stored personal information of the user and the location of the user device that is based on the one or more geographic coordinates;
   providing, by the one or more processors, the page to the user device and the operator device; and
   facilitating, by the one or more processors, communication between the user device and the operator device based on the provided page.

2. The method of claim 1, wherein the pre-stored personal information comprises at least a residence address of the user such that the page includes the residence address.

3. The method of claim 1, the method further comprising:
   identifying, by the one or more processors, a contact device used by a contact of a user of the user device; and
   providing, by the one or more processors, the page to the contact device.

4. The method of claim 1, the method further comprising:
   receiving, by the one or more processors, information input by at least one user to whom the page has been provided, the information being related to the service request;
   updating, by the one or more processors, the page based on the information input by the at least one user; and
   providing, by the one or more processors, the updated page.

5. The method of claim 4, wherein receiving the information input by at least one user comprises:
   receiving, by the one or more processors, video, image, or audio data from the user device that documents a scene related to the service request.

6. The method of claim 4, wherein receiving the information input by at least one user comprises:
   receiving, by the one or more processors, an indication from a responder device that the responder device is en route to service the service request.

7. The method of claim 4, wherein receiving the information input by at least one user comprises:
   receiving, by the one or more processors, an indication of a location of a responder device.

8. The method of claim 4, wherein receiving the information input by at least one user comprises:
   receiving, by the one or more processors, an indication from the operator device related to a status of servicing the service request.

9. The method of claim 1, wherein providing the page comprises:
   determining, by the one or more processors, at least one of two or more communication channels via which to provide at least a portion of the page, the at least one of two or more communication channels comprising a Short Message Service text message, a webpage, or a mobile application.

10. The method of claim 1, wherein the pre-stored personal information comprises a name of the user such that the page includes the name of the user.

11. The method of claim 1, wherein the pre-stored personal information comprises a medical information related to the user such that the page includes the medical information.

12. A system for responding to service requests and facilitating communication among parties related to the service request, the system comprising:
   one or more processors programmed by one or more computer program instructions to:
   process a service request from a user device;
   obtain a location of the user device based on one or more geographic coordinates;
   identify a user of the user device based on the service request;
   obtain pre-stored personal information of the user, wherein the pre-stored personal information: (i) is obtained from the user during a registration process that registers the user to allow the user to make the service request, (ii) is used in association with servicing the service request, and (iii) comprises demographic information that describes the user;
identify a service provider based on the location of the user device and the service request, wherein the service provider is associated with an operator device used by an operator to respond to the service request;
generate a page comprising the pre-stored personal information of the user and the location of the user device that is based on the one or more geographic coordinates;
provide the page to the user device and the operator device; and
facilitate communication between the user device and the operator device based on the provided page.

13. The system of claim 12, wherein the pre-stored personal information comprises at least a residence address of the user such that the page includes the residence address.

14. The system of claim 12, the one or more processors further programmed by one or more computer program instructions to:
identify a contact device used by a contact of a user of the user device; and
provide the page to the contact device.

15. The system of claim 12, the one or more processors further programmed by one or more computer program instructions to:
receive information input by at least one user to whom the page has been provided, the information being related to the service request;
update the page based on the information input by the at least one user; and
provide the updated page.

16. The system of claim 15, the one or more processors further programmed by one or more computer program instructions to:
receive video, image, or audio data from the user device that documents a scene related to the service request.

17. The system of claim 15, the one or more processors further programmed by one or more computer program instructions to:
receive an indication from a responder device that the responder device is en route to service the service request.

18. The system of claim 15, the one or more processors further programmed by one or more computer program instructions to:
receive an indication of a location of a responder device.

19. The system of claim 15, the one or more processors further programmed by one or more computer program instructions to:
receive an indication from the operator device related to a status of servicing the service request.

20. The system of claim 12, the one or more processors further programmed by one or more computer program instructions to:
determine at least one of two or more communication channels via which to provide at least a portion of the page, the at least one of two or more communication channels comprising a Short Message Service text message, a webpage, or a mobile application.

21. A method of responding to service requests and facilitating communication among parties related to the service request, the method being implemented in a computer that includes one or more processors programmed with one or more computer program instructions, the method comprising:
processing, by the one or more processors, a service request from a user device;
obtaining, by the one or more processors, a location of the user device based on one or more geographic coordinates;
identifying, by the one or more processors, a user of the user device based on the service request;
obtaining, by the one or more processors, pre-stored personal information of the user, wherein the pre-stored personal information: (i) is obtained from the user during a registration process that registers the user to allow the user to make the service request, and (ii) is used in association with servicing the service request;
identifying, by the one or more processors, a service provider based on the location of the user device and the service request, wherein the service provider is associated with an operator device used by an operator to respond to the service request;
generating, by the one or more processors, a page comprising the pre-stored personal information of the user and the location of the user device that is based on the one or more geographic coordinates;
providing, by the one or more processors, the page to the user device and the operator device by preferentially using a first communication channel instead of a second communication channel via which to provide the page based on one or more configurable rules that specify one or more preferred communication channels; and
facilitating, by the one or more processors, communication between the user device and the operator device based on the provided page.

22. A method of responding to service requests and facilitating communication among parties related to the service request, the method being implemented in a computer that includes one or more processors programmed with one or more computer program instructions, the method comprising:
processing, by the one or more processors, a service request from a user device;
obtaining, by the one or more processors, a location of the user device based on one or more geographic coordinates;
identifying, by the one or more processors, a user of the user device based on the service request;
obtaining, by the one or more processors, pre-stored personal information of the user, wherein the pre-stored personal information: (i) is obtained from the user during a registration process that registers the user to allow the user to make the service request, and (ii) is used in association with servicing the service request;
identifying, by the one or more processors, a service provider based on the location of the user device and the service request, wherein the service provider is associated with an operator device used by an operator to respond to the service request;
generating, by the one or more processors, a page comprising the pre-stored personal information of the user and the location of the user device that is based on the one or more geographic coordinates;
sending, by the one or more processors, a communication via a first communication channel;
determining, by the one or more processors, whether the first communication channel is available based on the communication; and providing, by the one or more processors, the page via the first communication channel responsive to a determination that the first communication channel is available; and facilitating, by the one or more processors, communication between the user device and the operator device based on the provided page.

23. The method of claim 22, the method further comprising:

responsive to a determination that the first communication channel is not available:

sending a second communication via a second communication channel;

determining whether the second communication channel is available based on the second communication; and providing the page via the second communication channel responsive to a determination that the second communication channel is available.

24. The method of claim 23, wherein an order of determining whether the first communication channel or the second communication channels is available is based on one or more configurable rules that specify one or more preferred communication channels.

* * * * *